US012386519B2

(12) United States Patent
Zhuo et al.

(10) Patent No.: US 12,386,519 B2
(45) Date of Patent: Aug. 12, 2025

(54) METHOD, ELECTRONIC DEVICE, AND COMPUTER PROGRAM PRODUCT FOR ALLOCATING STORAGE SPACE OF DISKS

(71) Applicant: Dell Products L.P., Round Rock, TX (US)

(72) Inventors: Baote Zhuo, Beijing (CN); Jian Gao, Beijing (CN); Hongpo Gao, Beijing (CN); Shaoqin Gong, Beijing (CN)

(73) Assignee: Dell Products L.P., Round Rock, TX (US)

( * ) Notice: Subject to any disclaimer, the term of this patent is extended or adjusted under 35 U.S.C. 154(b) by 160 days.

(21) Appl. No.: 17/987,310

(22) Filed: Nov. 15, 2022

(65) Prior Publication Data

US 2023/0342041 A1 Oct. 26, 2023

(30) Foreign Application Priority Data

Apr. 22, 2022 (CN) .......................... 202210429415.5

(51) Int. Cl.
    *G06F 3/06* (2006.01)
(52) U.S. Cl.
    CPC .......... *G06F 3/0619* (2013.01); *G06F 3/0631* (2013.01); *G06F 3/0689* (2013.01)
(58) Field of Classification Search
    CPC .... G06F 3/0619; G06F 3/0631; G06F 3/0689; G06F 3/0611; G06F 3/067; G06F 3/0605; G06F 3/0634; G06F 11/1448
    See application file for complete search history.

(56) References Cited

U.S. PATENT DOCUMENTS

| | | | |
|---|---|---|---|
| 10,521,302 B1 * | 12/2019 | Gao | G06F 3/0689 |
| 10,592,138 B1 * | 3/2020 | Han | G06F 3/0631 |
| 11,287,976 B2 | 3/2022 | Shang et al. | |
| 11,287,997 B2 | 3/2022 | Shang et al. | |
| 11,474,716 B2 | 10/2022 | Chen et al. | |
| 11,520,512 B2 | 12/2022 | Shang et al. | |
| 11,556,255 B2 | 1/2023 | Shang et al. | |
| 2015/0142829 A1 * | 5/2015 | Lee | G06F 16/13 711/170 |
| 2017/0017401 A1 * | 1/2017 | Grube | G06F 3/0685 |

OTHER PUBLICATIONS

The RAID Advisory Board, The RAIDBook, Jun. 9, 1993, first edition, entire book. (Year: 1993).*

* cited by examiner

Primary Examiner — Jason W Blust
(74) Attorney, Agent, or Firm — BainwoodHuang

(57) ABSTRACT

Techniques for allocating storage space of disks in a storage system involve selecting a current storage node from a plurality of storage nodes according to at least one previously selected storage node and association relationships between the plurality of storage nodes. Such techniques further involve selecting a current disk from a plurality of disks according to at least one previously selected disk, the current storage node, and association relationships between the plurality of disks. Such techniques further involve allocating at least one slice in the current disk to a redundant array of independent disks (RAID) stripe. Such a technique can support a distributed storage system having more storage nodes, can greatly reduce the time for allocating the storage space of disks, and can make a RAID stripe evenly allocated between the storage nodes and the disks in the storage system, thereby greatly improving a success rate of data recovery.

28 Claims, 5 Drawing Sheets

"METHOD, ELECTRONIC DEVICE, AND COMPUTER PROGRAM PRODUCT FOR ALLOCATING STORAGE SPACE OF DISKS"

CROSS-REFERENCE TO RELATED APPLICATION

This application claims priority to Chinese Patent Application No. CN202210429415.5, on file at the China National Intellectual Property Administration (CNIPA), having a filing date of Apr. 22, 2022 and having "A METHOD, AN ELECTRONIC DEVICE, AND A COMPUTER PRODUCT FOR ALLOCATING DISK STORAGE SPACE" as a title, the contents and teachings of which are herein incorporated by reference in their entirety.

TECHNICAL FIELD

Embodiments of the present disclosure relate to the field of data storage, and more particularly, to a method, an electronic device, and a computer program product for allocating storage space of disks in a storage system.

BACKGROUND

In an existing storage device, in order to better manage and optimize the data storage performance of the storage device, a plurality of disks included in the storage device are divided into several slices, and then a Redundant Array of Independent Disks (RAID) stripe (referred to as a Uber) is formed based on the plurality of slices of the plurality of disks.

With the increasing business demands, the demands for data processing or data calculation are also increasing. Correspondingly, users' demands for data storage are also increasing. In the prior art, there are various storage systems, and these storage systems include distributed storage systems. A distributed storage system includes a plurality of distributed storage nodes, and each storage node includes a plurality of disks for storing data.

As storage nodes of a storage system continue to increase, when disks in the storage nodes need to be allocated, it is usually necessary to traverse all the disks in the system in the prior art, which not only makes the allocation time too long, but also increases the system overhead and reduces the system performance.

SUMMARY OF THE INVENTION

Embodiments of the present disclosure provide a method, an electronic device, and a computer program product for allocating storage space of disks in a storage system.

According to a first aspect of the present disclosure, a method for allocating storage space of disks in a storage system is provided. The storage system includes a plurality of storage nodes, and each storage node in the plurality of storage nodes includes a plurality of disks. The method includes selecting a current storage node from the plurality of storage nodes according to at least one previously selected storage node and association relationships between the plurality of storage nodes. The method further includes selecting a current disk from the plurality of disks according to at least one previously selected disk, the current storage node, and association relationships between the plurality of disks. The method further includes allocating at least one slice in the current disk to a redundant array of independent disks (RAID) stripe.

According to a second aspect of the present disclosure, an electronic device is provided. The electronic device includes at least one processor; and a memory coupled to the at least one processor and having instructions stored thereon, wherein the instructions, when executed by the at least one processor, cause the device to perform actions including: selecting a current storage node from a plurality of storage nodes according to at least one previously selected storage node and association relationships between the plurality of storage nodes; selecting a current disk from a plurality of disks according to at least one previously selected disk, the current storage node, and association relationships between the plurality of disks; and allocating at least one slice in the current disk to a redundant array of independent disks (RAID) stripe.

According to a third aspect of the present disclosure, a computer program product is provided. The computer program product is tangibly stored on a non-volatile computer-readable medium and includes machine-executable instructions which, when executed, cause a machine to perform steps of the method in the first aspect of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure.

In the figures, identical or corresponding numerals represent identical or corresponding parts.

DETAILED DESCRIPTION

Figure 1:
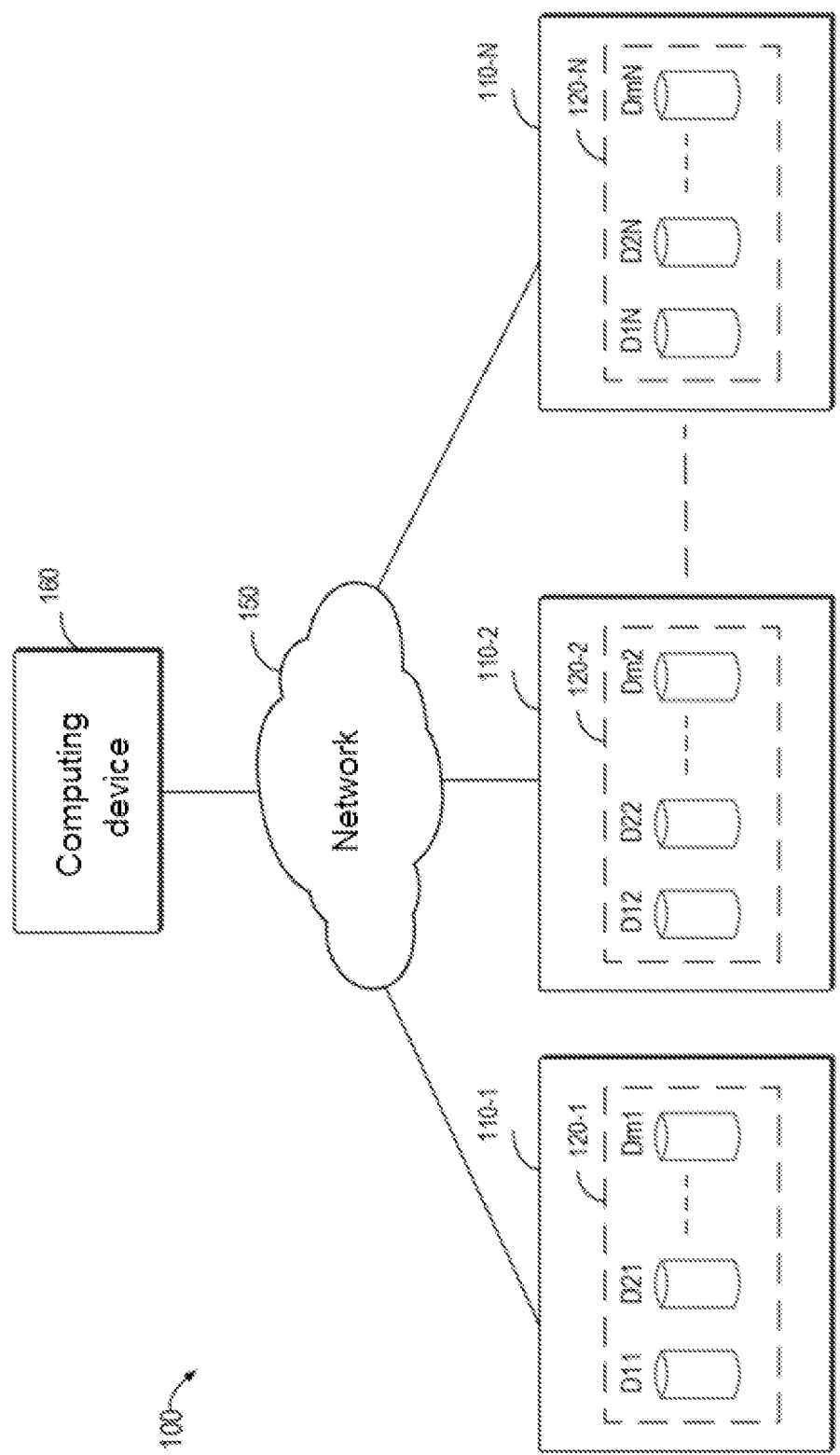
FIG. 1 is a schematic diagram of example environment 100 in which a device and/or a method according to an embodiment of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In an existing storage device, in order to better manage and optimize the data storage performance of the storage device, a plurality of disks included in the storage device are divided into several slices, and then a Redundant Array of Independent Disks (RAID) stripe (referred to as a Uber) is formed based on the plurality of slices of the plurality of disks.

With the increasing business demands, the demands for data processing or data calculation are also increasing. Correspondingly, users' demands for data storage are also increasing. In the prior art, there are various storage systems, and these storage systems include distributed storage systems. A distributed storage system includes a plurality of distributed storage nodes, and each storage node includes a plurality of disks for storing data.

As storage nodes of a storage system continue to increase, when disks in the storage nodes need to be allocated, it is usually necessary to traverse all the disks in the system in the prior art, which not only makes the allocation time too long, but also increases the system overhead and reduces the system performance. In addition, a distributed storage system needs to recover data when disks and storage nodes fail. However, in the prior art, the allocation of disks is uneven. For example, some storage nodes are allocated with more RAID stripes, and some storage nodes are allocated with fewer RAID stripes; and some disks are allocated with more RAID stripes, and some disks are allocated with fewer RAID stripes. As a result, when a disk and/or a storage node fails, the storage system will have certain difficulties in recovering data, and it cannot be ensured that the data can all be recovered correctly.

In order to at least solve the above and other potential problems, embodiments of the present disclosure propose a method for allocating storage space of disks in a storage system, the storage system includes a plurality of storage nodes, and each storage node in the plurality of storage nodes includes a plurality of disks. The method includes selecting a current storage node from the plurality of storage nodes according to at least one previously selected storage node and association relationships between the plurality of storage nodes. The method further includes selecting a current disk from the plurality of disks according to at least one previously selected disk, the current storage node, and association relationships between the plurality of disks. The method further includes allocating at least one slice in the current disk to a redundant array of independent disks (RAID) stripe. The method can support a distributed storage system having more storage nodes, can greatly reduce the time for allocating disks, and can make a redundant array of independent disks (RAID) stripe evenly allocated between the storage nodes and the disks in the storage system, thereby greatly improving a success rate of data recovery.

Embodiments of the present disclosure will be further described in detail with reference to the accompanying drawings below. FIG. 1 is a schematic diagram of an example environment in which the embodiments of the present disclosure can be implemented.

In the example environment shown in FIG. 1, storage system 100 in which embodiments of the present disclosure can be implemented is shown. Storage system 100 may include a distributed storage system. The storage system includes computing device 160, network 150, and a plurality of storage nodes 110-1 to 110-N(N being a positive integer greater than 1). Computing device 160 is connected to the plurality of storage nodes 110-$i$ through network 150. Network 150 includes, but is not limited to, the Internet, a local area network, a wireless network, and other various types of networks. In addition, although network 150 is shown, those skilled in the art should understand that the communication between computing device 160 and storage node 110-$i$ may also be performed through various types of buses, which is not limited by the present disclosure. Each storage node 110-$i$ includes a plurality of disks D1$i$ to Dm$i$ (m being a positive integer greater than or equal to 1). Computing device 160 is used for managing the plurality of storage nodes 110-$i$, including performing the allocation method described in the embodiments of the present disclosure for the plurality of disks (disks D11-Dm1 to D1N-DmN) in the plurality of storage nodes.

"Disk" described here may refer to any non-volatile storage medium currently known or to be developed in the future, and includes, but is not limited to, a magnetic disk, an optical disk, a solid state disk (SSD), or the like. In the description herein, it will be collectively referred to as "disk" for description. It should be understood, however, that this is for convenience of description only and does not imply any limitation on the scope of the present disclosure. Those skilled in the art can select a suitable non-volatile storage medium according to application requirements. The example shown in FIG. 1 is only illustrative, and those skilled in the art can understand that, according to the requirements of the storage system, the number of disks included in each storage node 110-$i$ may be the same or different, which is not limited by the present disclosure.

In one embodiment, a plurality of physical disks are combined into a logical storage unit, i.e., a redundant array of independent disks (RAID), for the purpose of data redundancy backup and/or performance improvement. It may be of different types, such as RAID 0, RAID 1, . . . , and RAID 5 depending on the level of redundancy and performance required.

Figure 2:
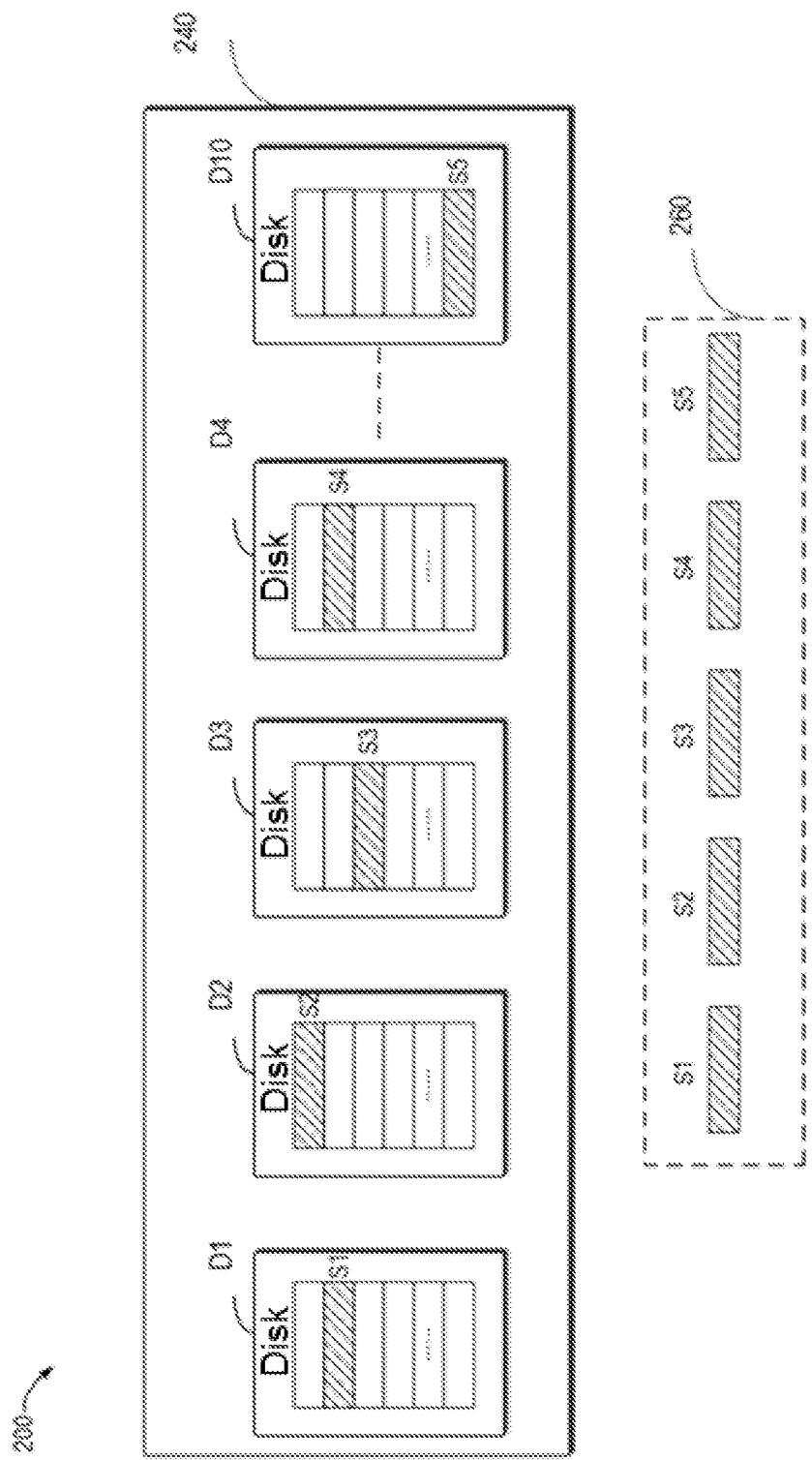
FIG. 2 is a schematic diagram of constructing an RAID stripe based on slices in disks according to an embodiment of the present disclosure.

One type of RAID may be constructed based on complete physical disks. This type of RAID N array includes N physical disks, and one array will consume the storage space of the occupied N disks to store data and parity information. Another type of RAID array can be constructed based on slices in disks. Description will be made below with reference to FIG. 2. A schematic diagram of a RAID constructed based on slices in disks according to an embodiment of the present disclosure is schematically illustrated in FIG. 2. In FIG. 2, illustration is made by taking disk array 240 (disk array 240 is a logical disk array composed of disks selected from a plurality of storage nodes) including 10 disks D1 to D10 (D1 to D10 may be from a plurality of storage nodes) as an example. However, it should be understood that this is given for illustrative purposes only and does not imply any limitation to the scope of the present disclosure. Embodiments of the present disclosure may be applied to arrays with other numbers of disks. As shown in FIG. 2, in order to construct a slice-based RAID, 5 disks may be selected from the 10 disks, and 1 slice may be selected from each of the selected 5 disks, thereby combining into RAID 260. For example, second slice S1 of first disk D1 (as shown in a pattern section in FIG. 2), first slice S2 of second disk D2 (as shown in the pattern section), third slice S3 of third disk D3 (as shown in the pattern section), second slice S4 of fourth disk D4 (as shown in the pattern section), and second slice S5 of tenth disk D10 (as shown in the pattern section) may be selected to form RAID stripe (uber) 260. RAID stripe 260 may include 5 slices, of which 4 are data slices and 1 is a check slice. A plurality of RAID stripes may be constructed in disk array 240.

However, it should be understood that this is given for illustrative purposes only and does not imply any limitation to the scope of the present disclosure. The embodiments of the present disclosure may be applied to other types of RAIDs with other layouts.

According to storage system 100 of the embodiment of the present disclosure, a RAID stripe may be constructed based on slices in disks. That is, when allocating disks in storage system 100, computing device 160 selects, according to the number of slices in a RAID stripe to be constructed, the number of disks from a plurality of storage nodes, then determines one slice from each of the selected disks, and allocates the slice to the RAID stripe. In one embodiment, a current storage node may be selected from the plurality of storage nodes according to at least one previously selected storage node and association relationships between the plurality of storage nodes. Then, a current disk is selected from a plurality of disks according to at least one previously selected disk, the current storage node, and association relationships between the plurality of disks. Afterwards, at least one slice in the current disk is allocated to the redundant array of independent disks (RAID) stripe. The above operations can be repeated until a predetermined number of slices are allocated into the column RAID stripe.

The method according to the embodiment of the present disclosure is easy to be deployed and implemented in a storage system, and through the method, a distributed storage system having more storage nodes can be supported, the time for allocating disks can be greatly reduced, and the RAID stripe can be evenly allocated among storage nodes and disks in the storage system, thereby greatly improving the success rate of data recovery.

Figure 3:
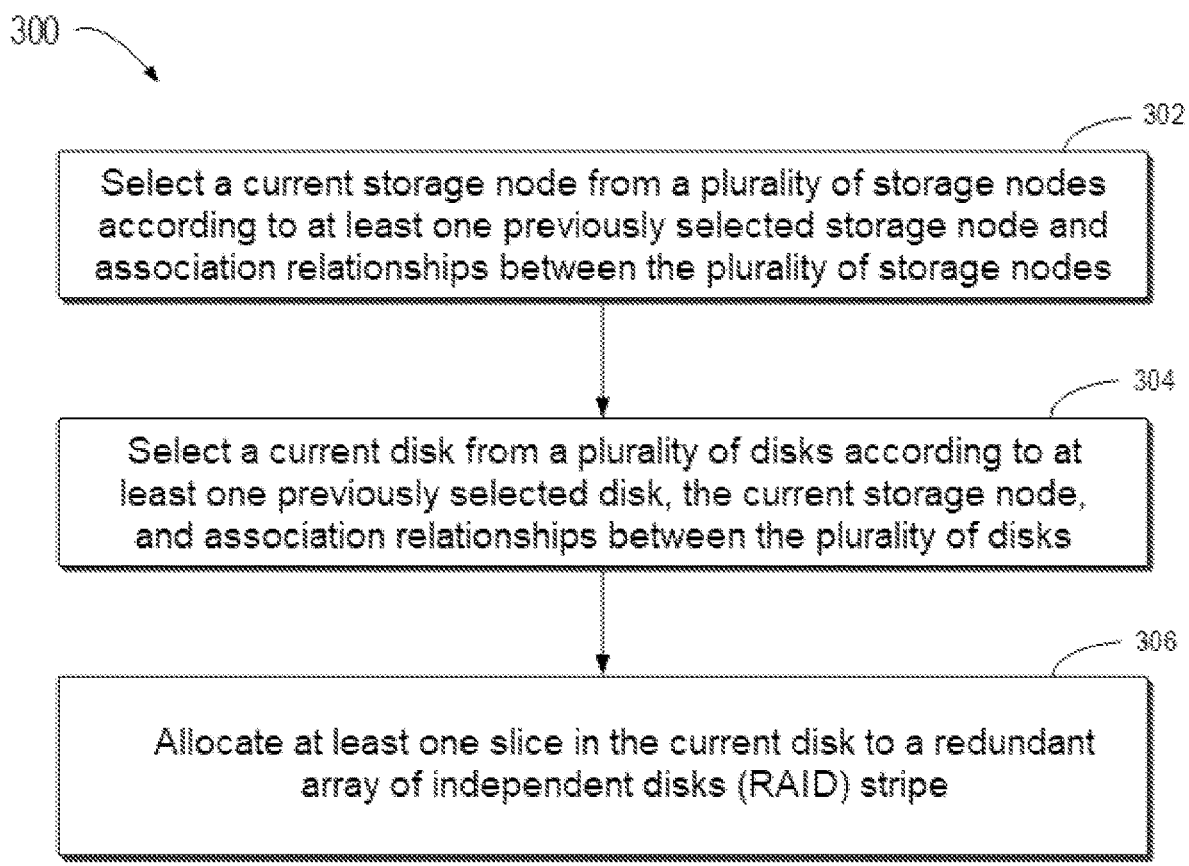
FIG. 3 is a schematic diagram of example method 300 for allocating disks according to an embodiment of the present disclosure.

A block diagram of example system 100 in which embodiments of the present disclosure can be implemented is described above with reference to FIG. 1, and a schematic diagram of a RAID stripe constructed based on slices in disks according to an embodiment of the present disclosure is described with reference to FIG. 2. A flow chart of method 300 for allocating storage space of disks according to an embodiment of the present disclosure is described below with reference to FIG. 3. Method 300 may be performed at computing device 160 in storage system 100 in FIG. 1 or at any suitable computing device.

At block 302, computing device 160 selects a current storage node from the plurality of storage nodes based on at least one previously selected storage node and association relationships between the plurality of storage nodes.

In one embodiment, the association relationships between the plurality of storage nodes 110-$i$ may indicate the number of times when every two storage nodes are allocated to the same RAID stripe. In one embodiment, a matrix in the form of neighborhood matrix may be used for representing the association relationships between the plurality of storage nodes 110-$i$. In one embodiment, each element in the matrix represents the degree of association between the storage node on the corresponding column and the storage node on the corresponding row. Specifically, each element in the matrix represents the number of times when the storage node on the corresponding column and the storage node on the corresponding row are allocated to the same RAID stripe.

In one embodiment, the previously selected storage node represents the storage node that is selected prior to the current selection. Depending on the number of selection iterations, the number of the previously selected storage nodes may be one or more. For example, the initially selected storage node usually includes one storage node, that is, the initial storage node. In the second selection after the initial selection, the previously selected storage node is the initially selected storage node, and in the case of the subsequent third selection, the previously selected storage node is the initially selected storage node and the second selected storage node, and so on.

For the initially selected storage node, that is, when initially selecting a storage node, computing device 160 may determine the storage node having the lowest usage rate among the plurality of storage nodes, and use the storage node having the lowest usage rate as the initial storage node. Correspondingly, after the initial storage node is obtained, the selected initial storage node may be used as the previously selected storage node for the selection of a storage node in the next selection. It should be understood by those skilled in the art that computing device 160 may also use other initial storage node selection strategies to select the initial storage node, which is not limited in the present disclosure.

At block 304, computing device 160 selects a current disk from the plurality of disks based on at least one previously selected disk, the current storage node, and association relationships between the plurality of disks.

In one embodiment, the association relationships between the plurality of disks may indicate the number of times when every two disks are allocated to the same RAID stripe. In one embodiment, a matrix in the form of neighborhood matrix may be used for representing the association relationships between the plurality of disks. In one embodiment, each element in the matrix represents the degree of association between the disk on the corresponding column and the disk on the corresponding row. Specifically, each element in the matrix represents the number of times when the disk on the corresponding column and the disk on the corresponding row are allocated to the same RAID stripe.

In one embodiment, the previously selected disk represents the disk that is selected prior to the current selection. Depending on the number of selection iterations, the number of the previously selected disks may be one or more. For example, the initially selected disk usually includes one disk, i.e., the initial disk. In the case of the second selection after the initial selection, the previously selected disk is the initially selected disk, and in the case of the subsequent third selection, the previously selected disk is the initially selected disk and the second selected disk, and so on.

For the initially selected disk, that is, when initially selecting a disk, computing device 160 may determine the disk having the lowest usage rate among the plurality of disks in the initially selected storage node, and use the disk having the lowest usage rate as the initial disk. Accordingly, after the initial disk is obtained, the selected initial disk may be used as the previously selected disk for the selection of a disk in the next selection. It should be understood by those skilled in the art that computing device 160 may also use other initial disk selection strategies to select the initial disk, which is not limited in the present disclosure.

At block 306, computing device 160 allocates at least one slice in the current disk to a redundant array of independent disks (RAID) stripe.

After the disk is determined at block 304, computing device 160 may allocate a slice in the determined current disk to the RAID stripe.

In one embodiment, computing device 160 may perform steps in blocks 302 to 306 iteratively until a predetermined number of slices are allocated into the RAID stripe, i.e., the construction of the RAID stripe is completed. For example, for an 8+1 RAID 5 stripe, 9 slices are required, and accordingly, computing device 160 may perform the steps in blocks 302 to 306 in 9 iterations, thereby completing the construction of an 8+1 RAID 5 stripe.

The method according to the embodiment of the present disclosure is easy to be deployed and implemented in a distributed storage system, and through the method, a distributed storage system having more storage nodes can be supported, the time for allocating storage space of disks can be greatly reduced, and the RAID stripe can be evenly allocated among storage nodes and disks in the storage system, thereby greatly improving the success rate of data recovery. In one embodiment, a first neighborhood matrix may be used for representing the association relationships between storage nodes, and a second neighborhood matrix may be used for representing the association relationships between disks. Correspondingly, computing device 160 may further use a first matrix to represent the association relationships between the plurality of storage nodes, and each element in the first matrix represents the degree of association between the storage node on the corresponding column and the storage node on the corresponding row. In addition, computing device 160 may also use a second matrix to represent the association relationships between the plurality of disks, and each element in the second matrix represents the degree of association between the disk on the corresponding column and the disk on the corresponding row.

In one embodiment, each element in the first matrix represents the number of times when the storage node on the corresponding column and the storage node on the corresponding row are allocated to the same RAID slice set, and each element in the second matrix represents the number of times when the disk on the corresponding column and the disk on the corresponding row are allocated to the same RAID slice set.

Figure 4:
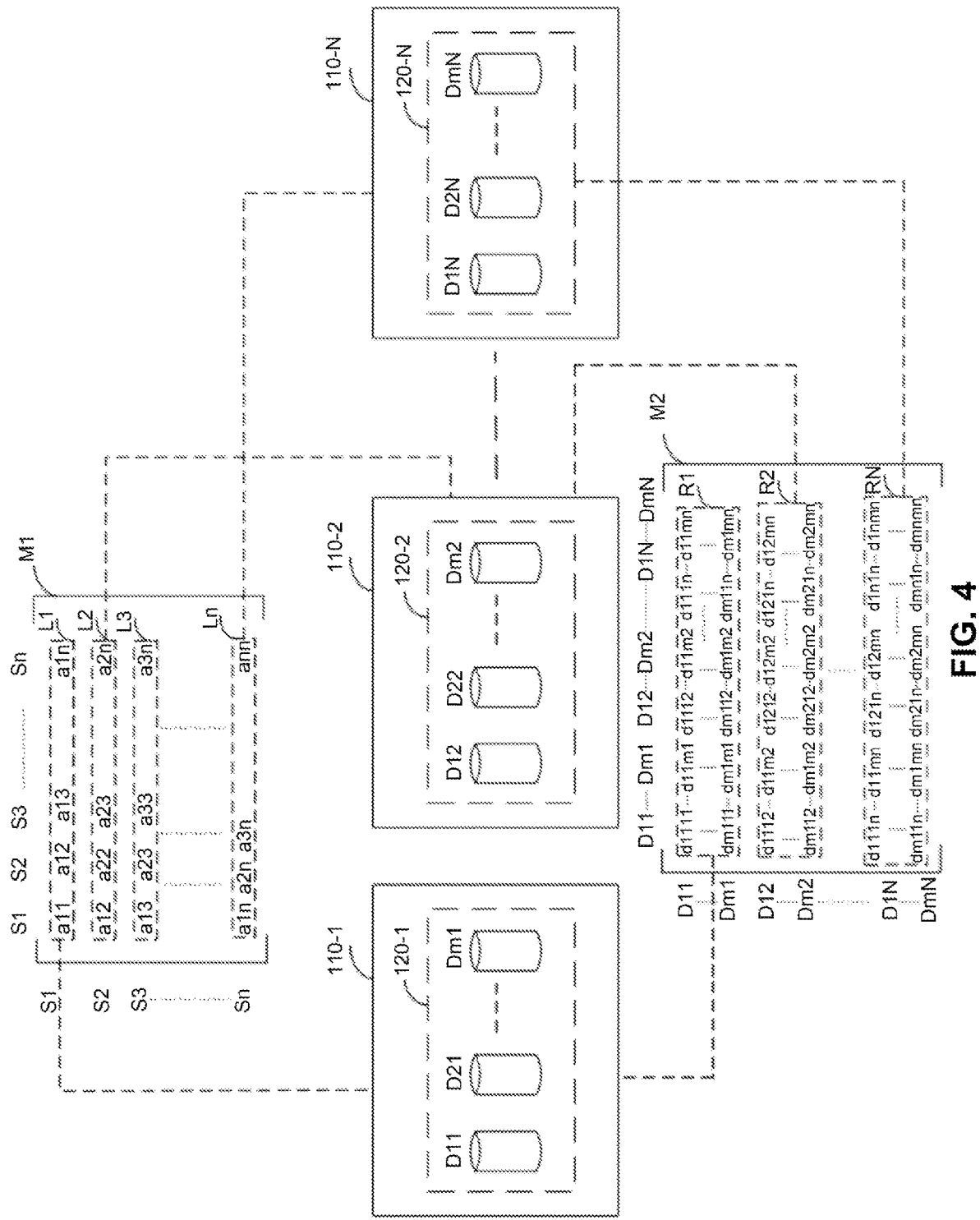
FIG. 4 is a schematic diagram for selecting a current storage node and a current disk according to a first matrix and a second matrix according to an embodiment of the present disclosure.

Hereinafter, a specific implementation manner of selecting the current storage node and the current disk will be described with reference to FIG. 4. FIG. 4 shows a schematic diagram of allocating disks (D11-Dm1, D12-Dm2, . . . , and D1N-DmN) in storage system 100 by using a neighborhood matrix according to an embodiment of the present disclosure.

As shown in FIG. 4, matrix M1 is a neighborhood matrix used for representing the association relationships between storage nodes 110-$i$, and an element of matrix M1 represents the degree of association between the storage node on the corresponding column and the storage node on the corresponding row. Each row in matrix M1 (shown by the dashed box in matrix M1 in FIG. 4) corresponds to each storage node. For example, first row L1 in matrix M1 corresponds to first storage node 110-1, second row L2 in matrix M1 corresponds to second storage node 110-2, third row L3 in matrix M1 corresponds to third storage node 110-3, and so on, i.e., nth row Ln in matrix M1 corresponds to Nth storage node 110-N. Similarly, each column in matrix M1 also corresponds to each storage node (not represented by a dashed box). For example, the first column in matrix M1 corresponds to first storage node 110-1, the second column in matrix M1 corresponds to second storage node 110-2, the third column in matrix M1 corresponds to third storage node 110-3, and so on, i.e., the Nth column in matrix M1 corresponds to Nth storage node 110-N. Correspondingly, an element of matrix M1 represent the degree of association between the storage node on the corresponding column and the storage node on the corresponding row. Specifically, an element of matrix M1 represents the number of times when the storage node on the corresponding column and the storage node on the corresponding row are allocated to the same RAID stripe. For example, the elements in the first row of matrix M1 represent the numbers of times when first storage node 110-1 and first storage node 110-1, second storage node 110-2, and Nth storage node 110-N are allocated into the same RAID stripe in sequence. For example, second element a12 of the first row in matrix M1 represents the number of times when first storage node 110-1 and second storage node 110-2 are allocated to the same RAID stripe. Based on the above description, it can be understood that neighborhood matrix M1 is actually a symmetric matrix. In addition, in FIG. 4, for the convenience of understanding, the dotted box of each row in matrix M1 is logically associated with the corresponding storage node by a dotted line, and it should be understood that the connection line between the dotted box and the storage node is only for the purpose of schematic illustration, and does not mean that there is a connection relationship between the box and the storage node.

Similarly, matrix M2 is a neighborhood matrix used for representing association relationships between disks (D11-Dm1, D12-Dm2, . . . , and D1N-DmN), and an element of matrix M2 represents the degree of association between the disk on the corresponding column and the disk on the corresponding row. It should be understood that one storage node includes a plurality of disks, for example, storage node 110-1 includes disks D11-Dm1, storage node 110-2 includes disks D12-Dm2, and storage node 110-N includes disks D1$n$-Dmn, and therefore, in matrix M2, a plurality of rows in which the disks included in the same storage node are located (as shown by dashed boxes in matrix M2 in FIG. 4) may correspond to the storage nodes. For example, the first row to mth row R1 in matrix M2 correspond to first storage node 110-1, the (1+m)th row to 2mth row R2 in matrix M2 correspond to second storage node 110-2, and so on, as shown by the dotted boxes in matrix M2, which shows the corresponding relationships of the rows in matrix M2 and the storage nodes. Similarly, the corresponding columns in matrix M2 also correspond to the storage nodes (not represented by dashed boxes), respectively. For example, the first column to the mth column in matrix M2 correspond to first storage node 110-1, the (1+m)th column to the 2mth column in matrix M2 correspond to second storage node 110-2, and so on. Accordingly, an element of matrix M2 represents the degree of association between the disk on the corresponding column and the disk on the corresponding row. Specifically, an element of matrix M2 represents the number of times when the disk on the corresponding column and the disk on the corresponding row are allocated to the same RAID stripe. For example, each element in the first row in matrix M21 represents the number of times when first disk D11 in first storage node 110-1 and other disks in the system are sequentially allocated to the same RAID stripe. For example, first element dm11 of the mth row in matrix M1 represents the number of times when mth disk Dm1 in first storage node 110-1 and other disks in the storage system are allocated to the same RAID stripe. Based on the above description, it can be understood that neighborhood matrix M2 is actually a symmetric matrix. In addition, in FIG. 4, for ease of understanding, the dotted box corresponding to each storage node in matrix M2 is logically associated with the corresponding storage node through dotted lines. It should be understood that the connection line between the dotted box and the storage node is only for the purpose of schematic illustration, and does not mean that there is a connection relationship between the box and the storage node. In addition, it should also be understood that m in matrix M2 is for illustration purposes only, and the number of disks in each storage node may be different according to the actual situation in the storage system. The number of rows in matrix M2 that correspond to the storage nodes is also different accordingly. The present disclosure does not limit the number in each storage node, and accordingly, does not limit the number of rows in matrix M2 and the number of rows corresponding to the storage nodes.

It should be understood that the storage nodes and the disks in the storage nodes are made corresponding to the rows of each matrix in FIG. 4; however, those skilled in the art should understand that corresponding relationships of the columns and the storage nodes and the disks in the storage nodes may also be according to the division of columns of the matrix. The specific implementation is similar to the above, and for the sake of brevity, details are not repeated here.

First, an implementation manner of selecting a current storage node is described with reference to FIG. 4. When selecting a current storage node from a plurality of storage nodes according to at least one previously selected storage node and association relationships between the plurality of storage nodes, computing device 160 may determine, in first matrix M1, a storage node having the lowest degree of association with the at least one previously selected storage node as the current storage node.

In one embodiment, computing device 160 may determine, in first matrix M1, at least one row corresponding to the at least one previously selected storage node. For example, assuming that the previously selected storage nodes are first storage node 110-1 and second storage node 110-2, then computing device 160 may determine, in first matrix M1, that the rows corresponding to the previously selected storage nodes are first row L1 and second row L2.

After determining the corresponding row, computing device 160 accumulates elements on the columns column by column in the determined row to obtain a plurality of accumulated sums respectively, wherein each accumulated sum represents the sum of the numbers of times when the storage node on the corresponding column and the previously selected storage node are allocated to the same RAID slice stripe. Computing device 160 further uses the storage node on the column corresponding to the minimum accumulated sum among the plurality of accumulated sums as the storage node having the lowest degree of association with the previously selected storage node to obtain the current storage node.

Continuing with the above example, after first row L1 and second row L2 in M1 are determined, computing device 160 accumulates the elements on the columns column by column in determined first row L1 and second row L2. For example, for first column S1 (i.e., corresponding to first storage node 110-1), computing device 160 accumulates the elements in the column corresponding to the first row and the second row, that is, a11+a12, to obtain accumulated sum sum1. Similarly, the computing device accumulates the elements of the second column located in the first row and the second row, i.e., a12+a22, to obtain accumulated sum sum2, the rest is analogized, and computing device 160 can obtain a plurality of accumulated sums sum1, sum2, . . . , and sumn. It can be understood that each accumulated sum represents the sum of the numbers of times when the corresponding storage node and the previously selected storage node are allocated to the same RAID stripe.

Then, computing device 160 selects minimum accumulated sum summon from the plurality of accumulated sums, and uses storage node $110_{min}$ on the column corresponding to the minimum accumulated sum as the storage node having the lowest degree of association with the previously selected storage node, and therefore, storage node $110_{min}$ is selected as the current storage node. It can be understood that the minimum accumulated sum indicates that the sum of the numbers of times when the corresponding storage node and the previously selected storage node are allocated to the same RAID stripe is the minimum. The storage node is selected as the current storage node, which can make the RAID stripe evenly distributed among storage nodes.

The specific implementation manner of selecting a current storage node is described above in conjunction with the rows. It can be understood that, in another embodiment, computing device 160 may alternatively determine at least one column corresponding to the at least one previously selected storage node in first matrix M1. For example, assuming that the previously selected storage nodes are first storage node 110-1 and second storage node 110-2, then computing device 160 may determine, in first matrix M1, the rows corresponding to the previously selected storage nodes are first column S1 and second column S2 (not all the columns are identified by dashed lines in FIG. 4).

After the corresponding column is determined, computing device 160 may, for each row, accumulate elements in the row corresponding to the determined column to obtain a plurality of accumulated sums respectively, wherein each accumulated sum represents the sum of the numbers of times when the storage node on the corresponding row and the previously selected storage node are allocated to the same RAID slice stripe. Computing device 160 further uses the storage node on the row corresponding to the minimum accumulated sum among the plurality of accumulated sums as the storage node having the lowest degree of association with the previously selected storage node to obtain the current storage node.

Continuing with the above example, after first column S1 and second column S2 in M1 are determined, computing device 160 may, for each row, accumulate elements in the row corresponding to determined first column S1 and second column S2. For example, for first row S1 (i.e., corresponding to first storage node 110-1), computing device 160 accumulates elements in the row corresponding to the first and second columns, that is, a11+a12, to obtain accumulated sum sum1. Similarly, the computing device accumulates elements in the second row corresponding to the first and second columns, i.e., a12+a22, to obtain accumulated sum sum2, the rest is analogized, and computing device 160 can obtain a plurality of accumulated sums sum1, sum2, . . . , and sumn. It can be understood that each accumulated sum represents the sum of the numbers of times when the corresponding storage node and the previously selected storage node are allocated to the same RAID stripe.

Then, computing device 160 selects minimum accumulated sum $sum_{min}$ from the plurality of accumulated sums, and uses storage node $110_{min}$ on the row corresponding to the minimum accumulated sum as the storage node having the lowest degree of association with the previously selected storage node, and therefore, storage node $110_{min}$ is selected as the current storage node. It can be understood that the minimum accumulated sum indicates that the sum of the numbers of times when the corresponding storage node and the previously selected storage node are allocated to the same RAID stripe is the minimum. The storage node is selected as the current storage node, which can make the RAID stripe evenly distributed among storage nodes.

After the current storage node is selected, computing device 160 selects a current disk among a plurality of disks according to at least one previously selected disk, the current storage node, and association relationships between the plurality of disks. In one embodiment, the computing device may determine, in second matrix M2, a disk having the lowest degree of association with the at least one previously selected disk as the current disk.

The following continues to describe an implementation manner of selecting a current disk with reference to FIG. 4. Computing device 160 may select a current disk among a plurality of disks according to at least one previously selected disk, the current storage node, and association relationships between the plurality of disks.

In one embodiment, computing device 160 may determine, in second matrix M2, at least one row corresponding to the previously selected disk and to the currently selected storage node. For example, continuing the above example, it is assumed that the previously selected storage nodes are first storage node 110-1 and second storage node 110-2, the previously selected disks are first disk D1i in first storage node 110-1 and second disk D22 in second storage node 110-2, and the currently selected storage node is Nth storage node 110-N. Then, computing device 160 may determine, in first matrix M2, row R11 (including the first row to the mth row) corresponding to previously selected disk D11, row R22 (including the (m+1)th row to the 2mth row) corresponding to previously selected disk R22, and row RN (row RN including the ((N−1)m+1)th row to the mNth row) corresponding to the currently selected storage node.

After the corresponding row is determined, computing device 160 may accumulate, in the determined row, elements on the columns column by column to obtain a plurality of accumulated sums respectively, wherein each accumulated sum represents the sum of the numbers of times when the disk on the corresponding column and the previously selected disk are allocated to the same RAID slice stripe. Computing device 160 further uses the disk on the column corresponding to the minimum accumulated sum among the plurality of accumulated sums as the disk having the lowest degree of association with the previously selected disk to obtain the current disk.

Continuing with the above example, after row R11, row R22, and row RN in M2 are determined, computing device 160 accumulates, in the determined rows, the elements on the columns column by column. For example, for first column D11 (i.e., corresponding to first disk D11 in first storage node 110-1), computing device 160 accumulates elements on the column corresponding to row R11, row R22, and row RN, to obtain accumulated sum sum1. Similarly, the computing device accumulates the elements on the second column corresponding to row R11, row R22, and row RN to obtain accumulated sum sum2, the rest is analogized, and computing device 160 can obtain a plurality of accumulated sums sum1, sum2, . . . , and sumn. It can be understood that each accumulated sum represents the sum of the numbers of times when the disk corresponding to the corresponding column and the previously selected disk are allocated to the same RAID stripe.

Then, computing device 160 selects the minimum accumulated sum $sum_{min}$ from the plurality of accumulated sums, and uses disk $D_{min}$ on the column corresponding to the minimum accumulated sum as the disk having the lowest degree of association with the previously selected disk, and thus, disk $D_{min}$ is selected as the current disk. It can be understood that the minimum accumulated sum indicates that the number of times when the corresponding disk and the previously selected disk are allocated to the same RAID stripe is the minimum. The disk is selected as the current disk, which can make the RAID stripe evenly allocated among the disks.

The specific implementation manner of selecting a current disk is described above in conjunction with the rows. It can be understood that, in another embodiment, computing device 160 may alternatively determine, in second matrix M2, at least one column corresponding to the previously selected disk and the currently selected storage node. For example, continuing the above example, it is assumed that the previously selected storage nodes are first storage node 110-1 and second storage node 110-2, the previously selected disks are first disk D11 in first storage node 110-1 and second disk D22 in second storage node 110-2, and the currently selected storage node is Nth storage node 110-N. Then, computing device 160 may determine, in first matrix M2, column C11 (including the first column to the mth column) corresponding to previously selected disk D11, column C22 (including the first column to the mth column) corresponding to previously selected disk D22, and column CN (column CN including the ((N−1)m+1)th column to the mNth column) corresponding to the currently selected storage node (the columns are not identified by dotted lines in FIG. 4).

After the corresponding columns are determined, computing device 160 may accumulate, for each row, the elements in the row corresponding to the determined columns to obtain a plurality of accumulated sums respectively, wherein each accumulated sum represents the sum of the numbers of times when the disk on the corresponding row and the previously selected disk are allocated to the same RAID stripe. Computing device 160 further uses the disk on the row corresponding to the minimum accumulated sum among the plurality of accumulated sums as the disk having the lowest degree of association with the previously selected disk to obtain the current disk.

Continuing with the above example, after corresponding columns in M2 are determined, computing device 160 accumulates, in the determined columns, the elements on the rows column by column. For example, for first row D11 (i.e., corresponding to first disk D11 in first storage node 110-1), computing device 160 accumulates the elements in the row corresponding to the determined columns (columns C11, C22, and CN) to obtain accumulated sum sum1. Similarly, the computing device accumulates the elements in the second row corresponding to the determined columns to obtain accumulated sum sum2, the rest is analogized, and computing device 160 can obtain a plurality of accumulated sums sum1, sum2, ..., and sumn. It can be understood that each accumulated sum represents the sum of the numbers of times when the corresponding disk and the previously selected disk are allocated to the same RAID stripe.

Then, computing device 160 selects the minimum accumulated sum $\text{sum}_{min}$ from the plurality of accumulated sums, and uses disk $D_{min}$ on the row corresponding to the minimum accumulated sum as the disk having the lowest degree of association with the previously selected disk, and thus, disk $D_{min}$ is selected as the current disk. It can be understood that the minimum accumulated sum indicates that the number of times when the corresponding disk and the previously selected disk are allocated to the same RAID stripe is the minimum. The disk is selected as the current disk, which can make the RAID stripe evenly allocated among the disks.

In one embodiment, after each selection of the current storage node and the current disk, computing device 160 may further update first matrix M1 and second M2 based on slice information in the RAID stripe (i.e., the storage nodes and disks allocated to the RAID stripe), so that the matrices can be updated in real time to obtain the updated association relationships between storage nodes and the association relationships between disks, thereby achieving dynamic allocation of disks.

The method according to the embodiment of the present disclosure is easy to be deployed and implemented in a distributed storage system, and through the method, a distributed storage system having more storage nodes can be supported, the time for allocating storage space of disks can be greatly reduced, and the RAID stripe can be evenly allocated among storage nodes and disks in the storage system, thereby greatly improving the success rate of data recovery.

Figure 5:
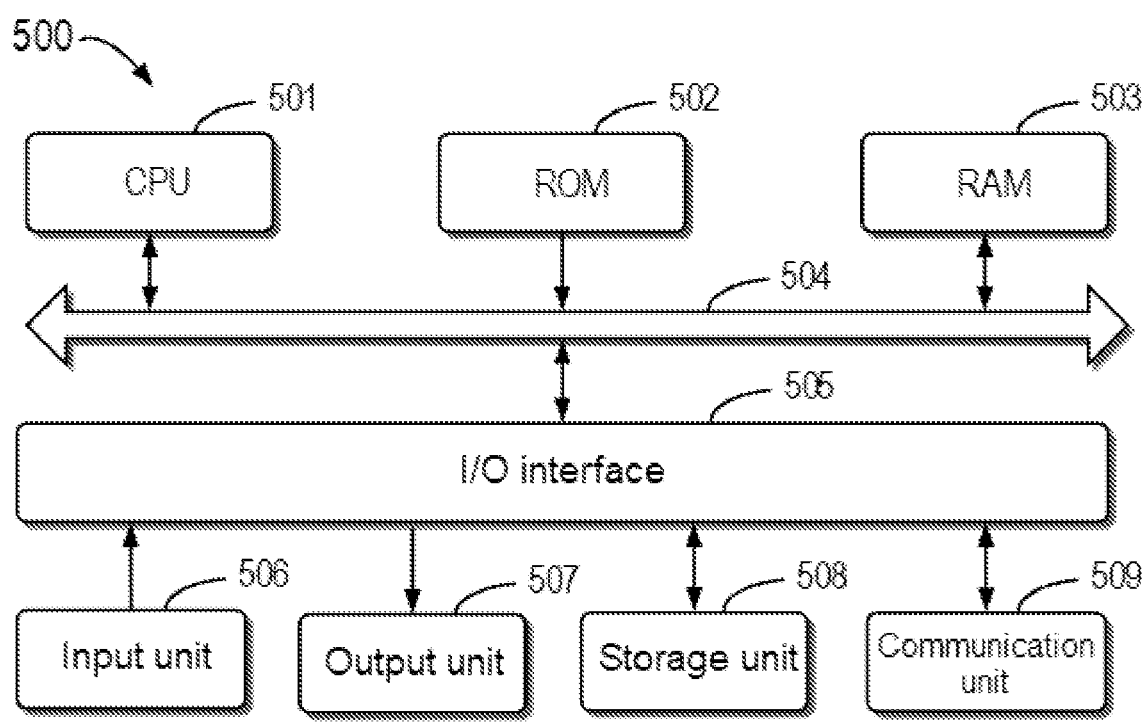
FIG. 5 is a schematic block diagram of example device 500 suitable for implementing embodiments of the content of the present disclosure.

FIG. 5 shows a schematic block diagram of example device 500 that may be used to implement embodiments of the present disclosure. Computing device 160 in FIG. 1 can be implemented using device 500. As shown in the figure, device 500 includes central processing unit (CPU) 501, which may execute various appropriate actions and processing in accordance with computer program instructions stored in read-only memory (ROM) 502 or computer program instructions loaded from storage unit 508 onto random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage page 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

Various processes and processing described above, for example, method 300, may be performed by processing unit 501. For example, in some embodiments, method 300 may be implemented as a computer software program that is tangibly included in a machine-readable medium such as storage unit 508. In some embodiments, part of or all the computer program may be loaded and/or installed to device 500 via ROM 502 and/or communication unit 509. When the computer program is loaded into RAM 503 and executed by CPU 501, one or more actions of method 300 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for allocating storage space of disks in a storage system, the storage system comprising a plurality of storage nodes, each storage node in the plurality of storage nodes comprising a plurality of disks, and the method comprising:
    selecting a current storage node from the plurality of storage nodes according to at least one previously selected storage node and association relationships between the plurality of storage nodes;
    selecting a current disk from the plurality of disks according to at least one previously selected disk, the current storage node, and association relationships between the plurality of disks; and
    allocating at least one slice in the current disk to a redundant array of independent disks (RAID) stripe;
    wherein the storage nodes of the plurality of storage nodes are constructed and arranged to communicate with a computing device over a computer network;
    wherein the method further comprises:
        managing a neighborhood matrix which identifies numbers of times that the current storage node and other storage nodes of the plurality of storage nodes are allocated to the same RAID stripe, at least some of the numbers of times being greater than one; and
    wherein allocating includes:
        exchanging communications between the computing device and the current storage node through the computer network to allocate a slice in the current disk to the RAID stripe based on accessing the neighborhood matrix to identify the numbers of times.

2. The method according to claim 1, wherein the method further comprises:
    determining, when initially selecting a storage node, a storage node having the lowest usage rate among the plurality of storage nodes; and
    using the storage node having the lowest usage rate as an initial storage node.

3. The method according to claim 2, wherein the method further comprises:
    determining, when initially selecting a disk, a disk having the lowest usage rate in the initial storage node; and
    using the disk having the lowest usage rate as an initial disk.

4. The method according to claim 1, wherein managing the neighborhood matrix includes:
    using, as the neighborhood matrix, a first matrix to represent the association relationships between the plurality of storage nodes, wherein each element in the first matrix represents a degree of association between a storage node on a corresponding column and a storage node on a corresponding row; and wherein the method further comprises:

using a second matrix to represent the association relationships between the plurality of disks, wherein each element in the second matrix represents a degree of association between a disk on a corresponding column and a disk on a corresponding row.

5. The method according to claim 4, wherein selecting a current storage node from the plurality of storage nodes according to at least one previously selected storage node and association relationships between the plurality of storage nodes comprises:

determining, in the first matrix, a storage node having the lowest degree of association with the at least one previously selected storage node as the current storage node.

6. The method according to claim 5, wherein the degree of association represents the number of times when the storage node on the corresponding column and the storage node on the corresponding row are allocated to the same RAID stripe, wherein determining a storage node having the lowest degree of association with the at least one previously selected storage node comprises:

determining, in the first matrix, at least one row or at least one column corresponding to the at least one previously selected storage node.

7. The method according to claim 6, wherein in the case that the at least one row is determined, determining a storage node having the lowest degree of association with the at least one previously selected storage node further comprises:

accumulating, in the determined at least one row, elements on the columns column by column to obtain a plurality of accumulated sums respectively, wherein each accumulated sum indicates a sum of the numbers of times when the storage node on the corresponding column and the at least one previously selected storage node are allocated to the same RAID stripe; and using a storage node on the column corresponding to the minimum accumulated sum among the plurality of accumulated sums as the storage node having the lowest degree of association with the at least one previously selected storage node, so as to acquire the current storage node.

8. The method according to claim 6, wherein in the case that the at least one column is determined, determining a storage node having the lowest degree of association with the at least one previously selected storage node further comprises:

accumulating, for each row, elements corresponding to the at least one column in the row to obtain a plurality of accumulated sums respectively, wherein each accumulated sum indicates a sum of the numbers of times when the storage node on the corresponding row and the at least one previously selected storage node are allocated to the same RAID stripe; and using a storage node on the row corresponding to the minimum accumulated sum among the plurality of accumulated sums as the storage node having the lowest degree of association with the at least one previously selected storage node, so as to acquire the current storage node.

9. The method according to claim 4, wherein selecting a current disk from the plurality of disks according to at least one previously selected disk, the current storage node, and association relationships between the plurality of disks comprises:

determining, in the second matrix, a disk having the lowest degree of association with the at least one previously selected disk as the current disk.

10. The method according to claim 9, wherein the degree of association represents the number of times when the disk on the corresponding column and the disk on the corresponding row are allocated to the same RAID stripe, wherein determining a disk having the lowest degree of association with the at least one previously selected disk comprises:

determining, in the second matrix, at least one row or at least one column corresponding to the at least one previously selected disk and the current storage node.

11. The method according to claim 10, wherein in the case that the at least one row is determined, determining a disk having the lowest degree of association with the at least one previously selected disk further comprises:

accumulating, in the determined at least one row, elements on the columns column by column to obtain a plurality of accumulated sums respectively, wherein each accumulated sum indicates a sum of the numbers of times when the disk on the corresponding column and the at least one previously selected disk are allocated to the same RAID stripe; and using a disk on the column corresponding to the minimum accumulated sum among the plurality of accumulated sums as the storage node having the lowest degree of association with the at least one previously selected disk, so as to acquire the current disk.

12. The method according to claim 10, wherein in the case that the at least one column is determined, determining a disk having the lowest degree of association with the at least one previously selected disk further comprises:

accumulating, for each row, elements corresponding to the at least one column in the row to obtain a plurality of accumulated sums respectively, wherein each accumulated sum indicates a sum of the numbers of times when the disk on the corresponding row and the at least one previously selected disk are allocated to the same RAID stripe; and using a disk on the row corresponding to the minimum accumulated sum among the plurality of accumulated sums as the storage node having the lowest degree of association with the at least one previously selected disk, so as to acquire the current disk.

13. The method according to claim 4, further comprising:
updating the first matrix and the second matrix based on slice information in the RAID stripe.

14. An electronic device for allocating storage space of disks in a storage system, the storage system comprising a plurality of storage nodes, each storage node in the plurality of storage nodes comprising a plurality of disks, and the electronic device comprising:

at least one processor; and a memory coupled to the at least one processor and having instructions stored therein, wherein the instructions, when executed by the at least one processor, cause the electronic device to perform actions comprising:

selecting a current storage node from the plurality of storage nodes according to at least one previously selected storage node and association relationships between the plurality of storage nodes;

selecting a current disk from the plurality of disks according to at least one previously selected disk, the current storage node, and association relationships between the plurality of disks; and allocating at least one slice in the current disk to a redundant array of independent disks (RAID) stripe;

wherein the storage nodes of the plurality of storage nodes are constructed and arranged to communicate with the electronic device over a computer network;

wherein the actions further comprise:

managing a neighborhood matrix which identifies numbers of times that the current storage node and other storage nodes of the plurality of storage nodes are allocated to the same RAID stripe, at least some of the numbers of times being greater than one; and wherein allocating includes:

exchanging communications between the electronic device and the current storage node through the computer network to allocate a slice in the current disk to the RAID stripe based on accessing the neighborhood matrix to identify the numbers of times.

15. The electronic device according to claim 14, wherein the instructions, when executed by the at least one processor, cause the electronic device to perform the following:

determining, when initially selecting a storage node, a storage node having the lowest usage rate among the plurality of storage nodes; and using the storage node having the lowest usage rate as an initial storage node.

16. The electronic device according to claim 14, wherein the instructions, when executed by the at least one processor, cause the electronic device to perform the following:

determining, when initially selecting a disk, a disk having the lowest usage rate in the initial storage node; and using the disk having the lowest usage rate as an initial disk.

17. The electronic device according to claim 14, wherein managing the neighborhood matrix includes:

using, as the neighborhood matrix, a first matrix to represent the association relationships between the plurality of storage nodes, wherein each element in the first matrix represents a degree of association between a storage node on a corresponding column and a storage node on a corresponding row; and wherein the instructions, when executed by the at least one processor, cause the electronic device to perform the following:

using a second matrix to represent the association relationships between the plurality of disks, wherein each element in the second matrix represents a degree of association between a disk on a corresponding column and a disk on a corresponding row.

18. The electronic device according to claim 17, wherein selecting a current storage node from the plurality of storage nodes according to at least one previously selected storage node and association relationships between the plurality of storage nodes comprises:

determining, in the first matrix, a storage node having the lowest degree of association with the at least one previously selected storage node as the current storage node.

19. The electronic device according to claim 18, wherein the degree of association represents the number of times when the storage node on the corresponding column and the storage node on the corresponding row are allocated to the same RAID stripe, wherein determining a storage node having the lowest degree of association with the at least one previously selected storage node comprises:

determining, in the first matrix, at least one row or at least one column corresponding to the at least one previously selected storage node.

20. The electronic device according to claim 19, wherein in the case that the at least one row is determined, determining a storage node having the lowest degree of association with the at least one previously selected storage node further comprises:

accumulating, in the determined at least one row, elements on the columns column by column to obtain a plurality of accumulated sums respectively, wherein each accumulated sum indicates a sum of the numbers of times when the storage node on the corresponding column and the at least one previously selected storage node are allocated to the same RAID stripe; and using a storage node on the column corresponding to the minimum accumulated sum among the plurality of accumulated sums as the storage node having the lowest degree of association with the at least one previously selected storage node, so as to acquire the current storage node.

21. The electronic device according to claim 19, wherein in the case that the at least one column is determined, determining a storage node having the lowest degree of association with the at least one previously selected storage node further comprises:

accumulating, for each row, elements corresponding to the at least one column in the row to obtain a plurality of accumulated sums respectively, wherein each accumulated sum indicates a sum of the numbers of times when the storage node on the corresponding row and the at least one previously selected storage node are allocated to the same RAID stripe; and using a storage node on the row corresponding to the minimum accumulated sum among the plurality of accumulated sums as the storage node having the lowest degree of association with the at least one previously selected storage node, so as to acquire the current storage node.

22. The electronic device according to claim 17, wherein selecting a current disk from the plurality of disks according to at least one previously selected disk, the current storage node, and association relationships between the plurality of disks comprises:

determining, in the second matrix, a disk having the lowest degree of association with the at least one previously selected disk as the current disk.

23. The electronic device according to claim 22, wherein the degree of association represents the number of times when the disk on the corresponding column and the disk on the corresponding row are allocated to the same RAID stripe, wherein determining a disk having the lowest degree of association with the at least one previously selected disk comprises:

determining, in the second matrix, at least one row or at least one column corresponding to the at least one previously selected disk and the current storage node.

24. The electronic device according to claim 23, wherein in the case that the at least one row is determined, determining a disk having the lowest degree of association with the at least one previously selected disk further comprises:

accumulating, in the determined at least one row, elements on the columns column by column to obtain a plurality of accumulated sums respectively, wherein each accumulated sum indicates a sum of the numbers of times when the disk on the corresponding column and the at least one previously selected disk are allocated to the same RAID stripe; and using a disk on the column corresponding to the minimum accumulated sum among the plurality of accumulated sums as the storage node having the lowest degree of association with the at least one previously selected disk, so as to acquire the current disk.

25. The electronic device according to claim 23, wherein in the case that the at least one column is determined, determining a disk having the lowest degree of association with the at least one previously selected disk further comprises:

accumulating, for each row, elements corresponding to the at least one column in the row to obtain a plurality of accumulated sums respectively, wherein each accumulated sum indicates a sum of the numbers of times when the disk on the corresponding row and the at least one previously selected disk are allocated to the same RAID stripe; and using a disk on the row corresponding to the minimum accumulated sum among the plurality of accumulated sums as the storage node having the lowest degree of association with the at least one previously selected disk, so as to acquire the current disk.

26. The electronic device according to claim 14, wherein the instructions, when executed by the at least one processor, cause the electronic device to perform the following:

updating the first matrix and the second matrix based on slice information in the to-be-allocated RAID stripe.

27. A computer program product having a non-transitory computer readable medium which stores a set of instructions to allocate storage space of disks in a storage system, the storage system comprising a plurality of storage nodes, each storage node in the plurality of storage nodes comprising a plurality of disks;

the set of instructions, when carried out by computerized circuitry, causing the computerized circuitry to perform a method of:

selecting a current storage node from the plurality of storage nodes according to at least one previously selected storage node and association relationships between the plurality of storage nodes;

selecting a current disk from the plurality of disks according to at least one previously selected disk, the current storage node, and association relationships between the plurality of disks; and allocating at least one slice in the current disk to a redundant array of independent disks (RAID) stripe;

wherein the storage nodes of the plurality of storage nodes are constructed and arranged to communicate with the computerized circuitry over a computer network;

wherein the method further comprises:

managing a neighborhood matrix which identifies numbers of times that the current storage node and other storage nodes of the plurality of storage nodes are allocated to the same RAID stripe, at least some of the numbers of times being greater than one; and wherein allocating includes:

exchanging communications between the computerized circuitry and the current storage node through the computer network to allocate a slice in the current disk to the RAID stripe based on accessing the neighborhood matrix to identify the numbers of times.

28. The computer program product according to claim 27, wherein the method further comprises:

determining, when initially selecting a storage node, a storage node having the lowest usage rate among the plurality of storage nodes; and using the storage node having the lowest usage rate as an initial storage node.

* * * * *